(12) United States Patent
Kimura et al.

(10) Patent No.: US 10,967,943 B2
(45) Date of Patent: *Apr. 6, 2021

(54) UNDERWATER MOBILE INSPECTION APPARATUS AND UNDERWATER INSPECTION EQUIPMENT

(71) Applicant: KAWASAKI JUKOGYO KABUSHIKI KAISHA, Kobe (JP)

(72) Inventors: Akira Kimura, Kobe (JP); Noriyuki Okaya, Kobe (JP); Kazuya Sumino, Osaka (JP); Minehiko Mukaida, Kobe (JP); Hiroaki Kagaya, Kobe (JP); Masanori Hamamatsu, Kobe (JP); Akiyoshi Saiki, Kobe (JP); Tetsuya Kubota, Kobe (JP); Masayuki Enomoto, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/572,766

(22) Filed: Sep. 17, 2019

(65) Prior Publication Data

US 2020/0010161 A1     Jan. 9, 2020

Related U.S. Application Data

(63) Continuation of application No. 15/686,828, filed on Aug. 25, 2017, now Pat. No. 10,450,041, which is a
(Continued)

(30) Foreign Application Priority Data

Sep. 26, 2011   (JP) ................................. 2011-209325

(51) Int. Cl.
*B63G 8/00* (2006.01)
*B63C 11/48* (2006.01)
(Continued)

(52) U.S. Cl.
CPC .............. *B63G 8/001* (2013.01); *B63C 11/48* (2013.01); *B63C 11/52* (2013.01); *G05D 1/0692* (2013.01);
(Continued)

(58) Field of Classification Search
CPC ........... B63G 8/00; B63G 8/001; B63C 11/00; B63C 11/48; B63C 11/52; G05D 1/0692; B63B 59/00
(Continued)

(56) References Cited

U.S. PATENT DOCUMENTS 2,987,893 A     6/1961   Robinson, Jr.
3,165,899 A     1/1965   Shatto, Jr.
(Continued)

FOREIGN PATENT DOCUMENTS

EP     0547685 A1     6/1993
GB     2453645 A      4/2009
(Continued)

OTHER PUBLICATIONS

International Search Report issued in International Application No. PCT/JP2012/005821 dated Dec. 18, 2012.
(Continued)

*Primary Examiner* — Lars A Olson
(74) *Attorney, Agent, or Firm* — Oliff PLC (57) ABSTRACT

An underwater mobile inspection apparatus capable of inspecting an inspection object on a seafloor while cruising includes a cruising body configured to submerge underwater and cruise along the inspection object so as to not come into contact with the inspection object, a first movable arm provided on the cruising-body, and an inspection tool unit provided on the first movable arm and including at least one of an image-capturing camera for use in visually inspecting the inspection object and a device configured to
(Continued)

inspect a wall thickness of the inspection object by using an ultrasonic wave. A controller is configured to, when the cruising-body cruises along the inspection object so as to not come into contact with the inspection object, operate the first movable arm to move the inspection tool unit, such that a positional relationship of the inspection tool unit with the inspection object becomes a predetermined target positional relationship.

11 Claims, 4 Drawing Sheets

Related U.S. Application Data continuation of application No. 15/340,344, filed on Nov. 1, 2016, now Pat. No. 9,776,695, which is a continuation of application No. 14/347,353, filed as application No. PCT/JP2012/005821 on Sep. 13, 2012, now Pat. No. 9,511,831.

(51) Int. Cl.
  *B63C 11/52* (2006.01)
  *G05D 1/06* (2006.01)
  *B63B 59/00* (2006.01)
(52) U.S. Cl.
  CPC ........ *B63B 59/00* (2013.01); *B63G 2008/004* (2013.01); *B63G 2008/005* (2013.01); *B63G 2008/008* (2013.01)
(58) Field of Classification Search
  USPC .......................................... 114/313, 321, 322
  See application file for complete search history.

(56) References Cited

U.S. PATENT DOCUMENTS

| | | |
|---|---|---|
| 3,381,485 A | 5/1968 | Crooks et al. |
| 3,550,386 A | 12/1970 | Ballinger |
| 3,621,911 A | 11/1971 | Baker et al. |
| 3,987,741 A | 10/1976 | Tryon |
| 4,502,407 A | 3/1985 | Stevens |
| 4,620,819 A | 11/1986 | Marsland et al. |
| 4,648,782 A | 3/1987 | Kraft |
| 5,097,780 A | 3/1992 | Winchester |
| 5,947,051 A | 9/1999 | Geiger |
| 6,317,387 B1 | 11/2001 | D'Amaddio et al. |
| 6,928,947 B1 | 8/2005 | Clapham |
| 9,511,831 B2 | 12/2016 | Kimura et al. |
| 9,776,695 B2 | 10/2017 | Kimura et al. |
| 10,450,041 B2 * | 10/2019 | Kimura ................... B63C 11/48 |
| 2009/0031940 A1 | 2/2009 | Stone et al. |
| 2009/0114140 A1 | 5/2009 | Guerrero et al. |

FOREIGN PATENT DOCUMENTS

| | | |
|---|---|---|
| JP | 60-138458 A | 7/1985 |
| JP | 02-503182 A | 10/1990 |
| JP | 2552547 Y2 | 10/1997 |
| JP | 9-329688 A | 12/1997 |
| JP | 3044217 B1 | 5/2000 |
| JP | 2006-298288 A | 11/2006 |
| WO | 89/07071 A2 | 8/1989 |

OTHER PUBLICATIONS

Jun. 23, 2015 Extended Search Report issued in European Application No. 12836311.6.

* cited by examiner

UNDERWATER MOBILE INSPECTION APPARATUS AND UNDERWATER INSPECTION EQUIPMENT

CROSS REFERENCE TO RELATED APPLICATION

This application is a continuation of U.S. patent application Ser. No. 15/686,828, filed Aug. 25, 2017, which is a continuation of U.S. patent application Ser. No. 15/340,344, filed Nov. 1, 2016, which is a continuation of U.S. patent application Ser. No. 14/347,353, filed Apr. 25, 2014, now U.S. Pat. No. 9,511,831, which is a National Stage of PCT/JP2012/005821, filed Sep. 13, 2012, which claims priority to Japanese Patent Application No. 2011-209325, filed Sep. 26, 2011, the contents of which are incorporated herein by reference.

TECHNICAL FIELD

The present invention relates to, for example, underwater mobile inspection apparatuses capable of performing various work while cruising, including an inspection of an inspection object such as a subsea pipeline or a subsea structure, and to underwater inspection equipment.

BACKGROUND ART

One example of a conventional underwater mobile inspection apparatus is a remotely operated underwater vehicle (see Patent Literature 1, for example). The remotely operated underwater vehicle is configured to inspect and clean a subsea structure such as a tubular member installed on the seafloor while running on the subsea structure via casters. An operator can control the remotely operated underwater vehicle by operating a ground-based control device while viewing the subsea structure from the ground via a video camera provided on the remotely operated underwater vehicle.

The remotely operated underwater vehicle allows the operator to operate a large number of thrusters, manipulators, and the like provided on the vehicle from the ground, and therefore, the operator can control the vehicle to move under water in a flexible manner like the operator him or herself, thereby inspecting and cleaning the subsea structure.

CITATION LIST

Patent Literature

PTL 1: Japanese National Phase PCT Laid-Open Publication No. 2-503182

SUMMARY OF INVENTION

Technical Problem

However, the above-described conventional remotely operated underwater vehicle has problems as follows. Since the remotely operated underwater vehicle inspects and cleans a subsea structure such as a tubular member installed on the seafloor while running on the subsea structure via casters, force based on the mass of the vehicle is applied to the subsea structure, and there is a possibility that stress due to the force causes damage to the subsea structure.

Further, in the case of the conventional remotely operated underwater vehicle, since the force based on the mass of the vehicle is applied to the subsea structure, loading of, for example, devices and manipulators necessary for the inspection and cleaning of the subsea structure onto the vehicle has a certain limit in consideration of increase in the loaded mass onto the vehicle. Such limitation is an obstacle to improvement in the quality of various work, including the inspection and cleaning of the subsea structure.

The present invention has been made to solve the above-described problems. An object of the present invention is to provide an underwater mobile inspection apparatus and underwater inspection equipment, which make it possible to prevent damage to an inspection object such as a subsea structure, the damage being due to receiving force based on the mass of a cruising body, and improve the quality of various work, including an inspection of the inspection object.

Solution to Problem

An underwater mobile inspection apparatus according to the present invention is capable of inspecting an inspection object on a seafloor while cruising. The underwater mobile inspection apparatus includes: a cruising body configured to submerge under water and cruise along the inspection object in such a manner as not to come into contact with the inspection object; a first movable arm provided on the cruising body; an inspection tool unit for use in inspecting the inspection object, the inspection tool unit being provided on the first movable arm; and a controller configured to, when the cruising body cruises along the inspection object in such a manner as not to come into contact with the inspection object, operate the first movable arm to move the inspection tool unit, such that a positional relationship of the inspection tool unit with the inspection object becomes a predetermined target positional relationship.

According to the underwater mobile inspection apparatus of the present invention, the cruising body can submerge under water and cruise along the inspection object in such a manner as not to come into contact with the inspection object. At the time, the inspection tool unit provided on the cruising body via the first movable arm can be controlled to follow the cruising body. When the cruising body cruises along the inspection object in such a manner as not to come into contact with the inspection object, the controller can operate the first movable arm to move the inspection tool unit, such that the positional relationship of the inspection tool unit with the inspection object becomes a predetermined target positional relationship. This makes it possible to precisely inspect an inspection target area of the inspection object by using the inspection tool unit.

In the underwater mobile inspection apparatus according to the present invention, the cruising body may include an inspection object detector configured to obtain inspection object information containing a positional relationship between the cruising body and the inspection object and a shape of the inspection object, and the controller may control the cruising body based on the inspection object information, such that the cruising body autonomously cruises along the inspection object in such a manner as not to come into contact with the inspection object.

The above configuration allows the controller to control the cruising body based on the inspection object information, such that the cruising body autonomously cruises along the inspection object in such a manner as not to come into contact with the inspection object. The inspection object information is information containing, for example, a positional relationship between the cruising body and a pipeline and the shape of the pipeline. Since the cruising body is configured to autonomously cruise along the inspection object, it is not necessary to remote-control the underwater mobile inspection apparatus from an offshore support ship, and the inspection object can be inspected automatically. This makes it possible to reduce labor hours, labor costs, and costs of the support ship for inspecting the inspection object.

The underwater mobile inspection apparatus according to the present invention may include: an inspection object detector included in the cruising body and configured to obtain inspection object information containing a positional relationship between the inspection tool unit and the inspection object and a shape of the inspection object; a second movable arm provided on the inspection tool unit; and an image-capturing camera for use in visually inspecting the inspection object, the image-capturing camera being provided on the second movable arm. The controller may control the second movable arm based on the inspection object information, such that a positional relationship of the image-capturing camera with the inspection object becomes a predetermined target positional relationship.

According to the above configuration, when the cruising body cruises along the inspection object in such a manner as not to come into contact with the inspection object, the controller can operate the second movable arm based on the inspection object information obtained by the inspection object detector to move the image-capturing camera, such that the positional relationship of the image-capturing camera with the inspection object becomes a predetermined target positional relationship. This allows the image-capturing camera to precisely capture an image of the external view of a predetermined target area of the inspection object. By visually confirming image data of the captured image, an operator is allowed to perform precise visual inspection of a subsea pipeline.

In the underwater mobile inspection apparatus according to the present invention, the inspection tool unit may include at least one of an anti-corrosion inspection device and a wall thickness inspection device.

According to the above configuration, when the underwater mobile inspection apparatus submerges under water and cruises along the inspection object in such a manner as not to collie into contact with the inspection object, for example, the degree of degradation of anti-corrosion treatment of the inspection object can be inspected by using the anti-corrosion inspection device. In addition, the wall thickness of the inspection object can be inspected by using the wall thickness inspection device. Thus, the degree of corrosion of the inspection object and the presence or absence of damage to the inspection object can be inspected.

In the underwater mobile inspection apparatus according to the present invention, the anti-corrosion inspection device may include an anti-corrosion potential measurement device. The anti-corrosion potential measurement device may include: a potential measurement probe provided on the inspection tool unit; and a remote electrode connected to a linear object reeled out from an electrode winch provided on the cruising body.

When the anti-corrosion potential measurement device is used as the anti-corrosion inspection device, first, the linear object is reeled out from the electrode winch of the cruising body by a predetermined length, and the remote electrode connected to the linear object is moved away from the potential measurement probe of the inspection tool unit. Next, a potential difference between the potential measurement probe positioned near the inspection object and the remote electrode is measured. Based on the measured potential difference, the degree of anti-corrosion protection (i.e., the degree of corrosion) of the inspection object can be inspected. The electrode winch for reeling in or out the linear object to which the remote electrode of the anti-corrosion potential measurement device is connected is provided on the cruising body. Since the cruising body can cruise along the inspection object in such a manner as not to come into contact with the inspection object, damage to the inspection object due to force based on the mass of the cruising body including the electrode winch can be prevented, In the underwater mobile inspection apparatus according to the present invention, the first movable arm may include a parallel link mechanism.

The above configuration makes it possible to reduce a necessary number of joints of the first movable arm for the controller to operate the first movable arm to move the inspection tool unit such that the positional relationship of the inspection tool unit with the inspection object becomes a predetermined target positional relationship. As a result, a compact and light-weight first movable arm can be provided, and also, the control of the first movable arm can be readily performed.

In the underwater mobile inspection apparatus according to the present invention, the inspection tool unit may be provided with a running part configured to allow the inspection tool unit to run on the inspection object, and the controller may operate the first movable arm by force feedback control, such that the inspection tool unit is in pressure contact with the inspection object with predetermined target pressing force.

According to the above configuration, the inspection tool unit can run on the inspection object while following the cruising of the cruising body. Since the inspection tool unit runs on the inspection object, the inspection object serves to assist in guiding the inspection tool unit to be in a predetermined target positional relationship with the inspection object. The controller is configured to operate the first movable arm by force feedback control, such that the inspection tool unit is in pressure contact with the inspection object with predetermined target pressing force. Therefore, even though there is the weight of the inspection tool unit as well as inertial force exerted on the inspection tool unit, force applied to the inspection object can be controlled to be substantially the target pressing force. This consequently makes it possible to prevent a situation where the inspection object receives the weight of the cruising body and inertial force exerted on the cruising body and thereby becomes damaged.

In the underwater mobile inspection apparatus according to the present invention, the running part may be a wheel.

By thus using the wheel as the running part, the body of the inspection tool unit can be prevented from coming into contact with the inspection object, and thereby damage to the inspection tool unit due to such contact can be prevented.

Underwater inspection equipment according to the present invention includes: the underwater mobile inspection apparatus according to the present invention; and a docking station disposed on a seafloor. The underwater mobile inspection apparatus is configured to be docked with and undocked from the docking station disposed on the seafloor. In a state where the underwater mobile inspection apparatus is docked with the docking station, a first connector provided on the underwater mobile inspection apparatus is connected to a second connector provided in the docking station, and charging of a battery of the underwater mobile inspection apparatus, transmission of inspection data that has been obtained, or reception of an inspection instruction is performed.

According to the underwater inspection equipment of the present invention, after the underwater mobile inspection apparatus has inspected the inspection object, the underwater mobile inspection apparatus is docked with the docking station disposed on the seafloor, and the first connector of the underwater mobile inspection apparatus is connected to the second connector of the docking station. In this state, charging of the battery of the underwater mobile inspection apparatus, transmission of inspection data that has been obtained, or reception of an inspection instruction can be performed.

In other words, the underwater mobile inspection apparatus can transmit the obtained inspection data to the docking station, and an operator can know inspection results of the inspection object based on the transmitted inspection data. Then, based on a received inspection instruction, the underwater mobile inspection apparatus can perform an inspection of a next inspection object. When the battery of the underwater mobile inspection apparatus has been charged, the underwater mobile inspection apparatus can go on to the inspection of the next inspection object while keeping staying in a submerged state at the seafloor. This makes it possible to reduce a time required for performing the inspections and reduce labor hours.

In the underwater inspection equipment according to the present invention, the underwater mobile inspection apparatus may be configured to store image data in a recording device included in the underwater mobile inspection apparatus, the image data being obtained by capturing an image of the inspection object with the image-capturing camera. In a state where the underwater mobile inspection apparatus is docked with the docking station, the underwater mobile inspection apparatus may transmit the image data.

According to the above configuration, when the underwater mobile inspection apparatus inspects the inspection object, the image-capturing camera captures an image of the inspection object, and image data of the captured image can be stored in the recording device included in the underwater mobile inspection apparatus. Then, in a state where the underwater mobile inspection apparatus is docked with the docking station, the image data stored in the recording device can be transmitted to, for example, an offshore location.

Advantageous Effects of Invention

According to the underwater mobile inspection apparatus and underwater inspection equipment of the present invention, the cruising body is configured to submerge under water and cruise along the inspection object in such a manner as not to come into contact with the inspection object. This makes it possible to prevent force based on the mass of the cruising body from being applied to the inspection object. Consequently, damage to the inspection object due to receiving force based on the mass of the cruising body can be prevented. This makes it possible to perform high-speed inspection work while cruising at a high speed.

Even if mechanical tools and devices with great mass that are necessary for the inspection work are loaded on the cruising body, force based on the mass of the cruising body is not applied to the inspection object. Therefore, more mechanical tools and the like can be loaded on the cruising body compared to the conventional art. This makes it possible to improve the quality of various work, including an inspection and cleaning of the inspection object.

The controller is configured to, when the cruising body cruises along the inspection object, operate the first movable arm to move the inspection tool unit, such that the positional relationship of the inspection tool unit with the inspection object becomes a predetermined target positional relationship. Therefore, by means of the inspection tool unit, an inspection of a predetermined target area of the inspection object can be precisely performed. Thus, provided is the underwater mobile inspection apparatus, which makes it possible to improve the quality of various work, including an inspection of the inspection object.

DESCRIPTION OF EMBODIMENTS

Figure 1:
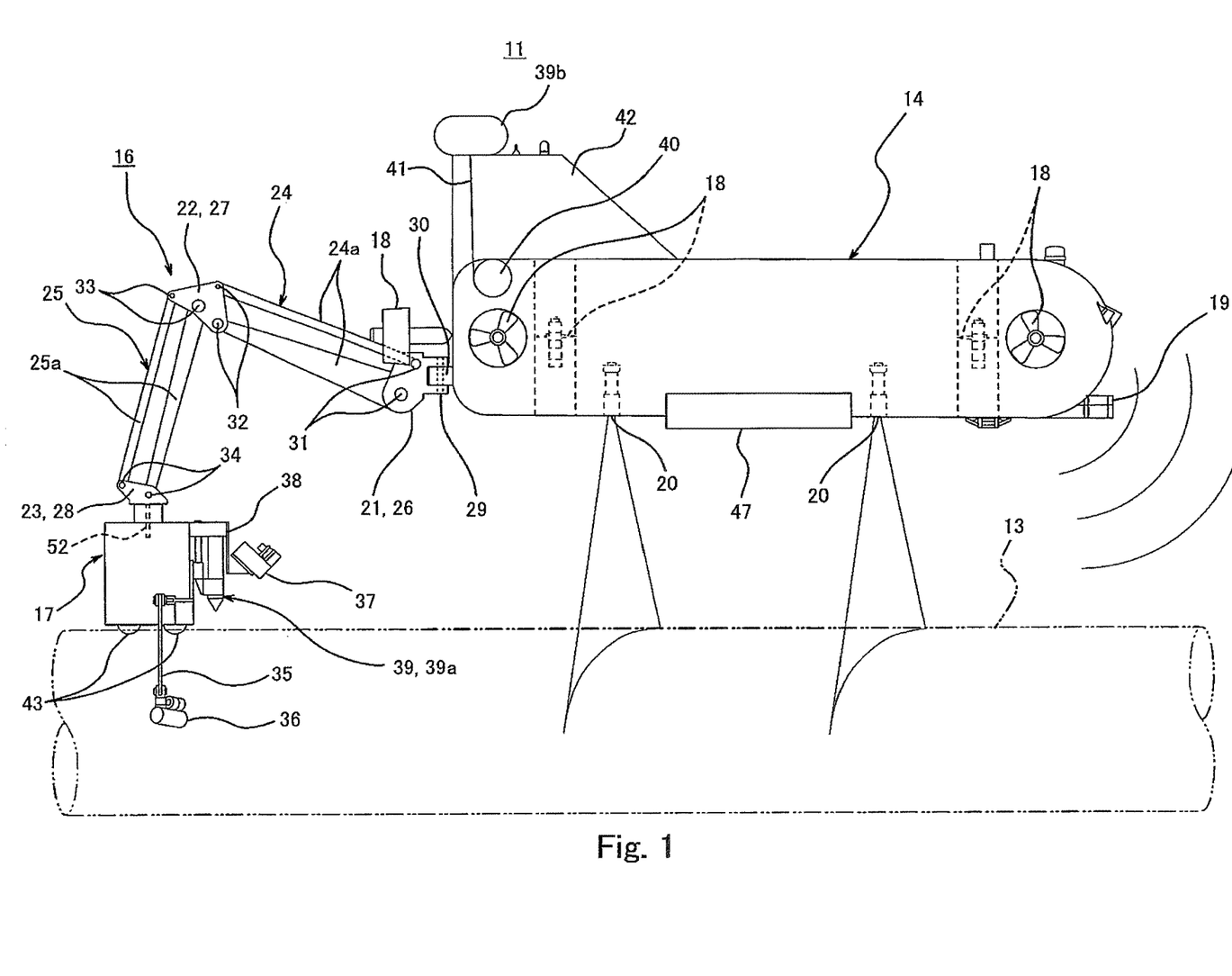
FIG. 1 is an enlarged side view showing an underwater mobile inspection apparatus according to one embodiment of the present invention.

Hereinafter, one embodiment of an underwater mobile inspection apparatus and underwater inspection equipment according to the present invention is described with reference to FIG. 1 to FIG. 4. As shown in FIG. 1, an underwater mobile inspection apparatus 11 according to the present embodiment is capable of, for example, performing various work while cruising, including an inspection of an inspection object 13 such as a subsea pipeline or a subsea structure. The underwater mobile inspection apparatus 11 makes it possible to prevent damage to the inspection object 13 such as a subsea structure, the damage being due to receiving force based on the mass of a cruising body 14, and improve the quality of various work, including the inspection of the inspection object 13. In the description below, the inspection object 13 is a subsea pipeline, As shown in FIG. 4, underwater inspection equipment 12 according to the present embodiment includes the underwater mobile inspection apparatus 11 and a docking station 15 disposed on the seafloor. In a state where the underwater mobile inspection apparatus 11 is docked with the docking station 15, charging of a battery of the underwater mobile inspection apparatus 11, transmission of inspection data that has been obtained, and reception of an inspection instruction can be performed.

As shown in FIG. 1, the underwater mobile inspection apparatus 11 includes the cruising body 14, a first movable arm 16, and an inspection tool unit 17.

The cruising body 14 shown in FIG. 1 is, for example, a flat plate-shaped autonomous unmanned underwater vehicle. The cruising body 14 is configured to automatically submerge under water and cruise along the subsea pipeline 13 in such a manner as not to come into contact with the subsea pipeline 13 in accordance with a predetermined program. The cruising body 14 includes: a main-propulsion thruster 18; and other thrusters 18 for use in, for example, control of the orientation of the cruising body 14 and delicate correction of the cruising path of the cruising body 14.

The cruising body 14 includes first and second detectors 19 and 20 for obtaining inspection object information. The inspection object information contains a positional relationship between the cruising body 14 and the subsea pipeline 13, a positional relationship between the inspection tool unit 17 and the subsea pipeline 13, and the shape of the subsea pipeline 13.

The first detector 19 is a multi-beam sonar. As shown in FIG. 1, the first detector 19 is provided at the lower front of the cruising body 14. The first detector 19 mainly serves to collect inspection object information regarding a forward intermediate distance range. The inspection object information regarding the forward intermediate distance range is information about conditions of the subsea pipeline 13 and its vicinity that are an intermediate distance away, for example, the degree of bending of the subsea pipeline 13 at a forward location that is the intermediate distance away as well as the presence or absence of foreign matter on the pipeline at the forward location.

The second detectors 20 are lasers for use in shape recognition. As shown in FIG. 1, one of the second detectors 20 is disposed at the front bottom surface of the cruising body 14 and the other second detector 20 is disposed at the rear bottom surface of the cruising body 14, such that the second detectors 20 are spaced apart from each other. These two lasers for shape recognition mainly serve to collect inspection object information regarding a forward short distance range based on a difference between their relative positions. The inspection object information regarding the forward short distance range is information about conditions of the subsea pipeline 13 and its vicinity that are a short distance away, for example, the degree of bending of the subsea pipeline 13 at a forward location that is the short distance away as well as the presence or absence of foreign matter on the pipeline at the forward location.

As shown in FIG. 1, the first movable arm 16 is an articulated robot arm. The proximal end of the first movable arm 16 is connected to the rear of the cruising body 14, and the inspection tool unit 17 is attached to the distal end of the first movable arm 16. The first movable arm 16 includes first to third joints 21, 22, and 23. The first joint 21 is provided at the rear of the cruising body 14. A first parallel link mechanism 24 is provided between the first joint 21 and the second joint 22. A second parallel link mechanism 25 is provided between the second joint 22 and the third joint 23. The inspection tool unit 17 is provided at the third joint 23.

The first joint 21 includes a first frame 26. The first frame 26 is rotatably connected, via a vertical shaft 29, to a support protrusion 30 provided at the rear of the cruising body 14. A first driver (not shown) drives the first frame 26 (first movable arm 16) to rotate around the vertical shaft 29.

The first parallel link mechanism 24 includes two parallel links 24a. One ends of the two respective parallel links 24a are rotatably connected to the first frame 26 via horizontal shafts 31. The other ends of the two respective parallel links 24a are rotatably connected to a second frame 27 via horizontal shafts 32. A second driver (not shown) drives the first parallel link mechanism 24 to rotate around the horizontal shafts 31.

The second parallel link mechanism 25 includes two parallel links 25a. On ends of the two respective parallel links 25a are rotatably connected to the second frame 27 via horizontal shafts 33. The other ends of the two respective parallel links 25a are rotatably connected to a third frame 28 via horizontal shafts 34. A third driver (not shown) drives the second parallel link mechanism 25 to rotate around the horizontal shafts 33.

A fourth driver (not shown) drives the inspection tool unit 17 to rotate around a vertical shaft 52 relative to the third frame 28.

The inspection tool unit 17 is provided on the third frame 28.

As shown in FIG. 1, the inspection tool unit. 17 is box-shaped. The inspection tool unit 17 accommodates therein control devices for various inspection devices, which will be described below. A pair of second movable arms 35 is provided such that the second movable arms 35 are provided at the left and right side surfaces, respectively, of the inspection tool unit 17. First and second image-capturing cameras (e.g., video cameras) 36 are provided on the distal ends of the pair of respective second movable arms 35.

The first and second image-capturing cameras 36 are configured to capture images of the left and right side surfaces of the subsea pipeline 13. The captured images allow an operator to visually inspect the left and right side surfaces of the pipeline.

Moreover, as shown in FIG. 1, a third image-capturing camera 37 is provided on the front surface of the inspection tool unit 17 via a bracket 38. The third image-capturing camera 37 is configured to capture an image of the upper surface of the subsea pipeline 13. The captured image allows the operator to visually inspect the upper surface of the pipeline.

As shown in FIG. 1, the inspection tool unit 17 further includes an anti-corrosion inspection device 39 and a wall thickness inspection device (not shown).

The anti-corrosion inspection device 39 serves to inspect the degree of degradation of anti-corrosion treatment (e.g., anti-corrosion coating) of the subsea pipeline 13 for its overall length. The anti-corrosion inspection device 39 includes a potential measurement probe 39a and a remote electrode 39b. The potential measurement probe 39a is provided on the inspection tool unit 17 via the bracket 38. The distal end of the potential measurement probe 39a is positioned near the upper surface of the pipeline 13. The remote electrode 39b is connected to the distal end of a linear object 41 which is reeled out from an electrode winch 40 provided on the cruising body 14.

Figure 2:
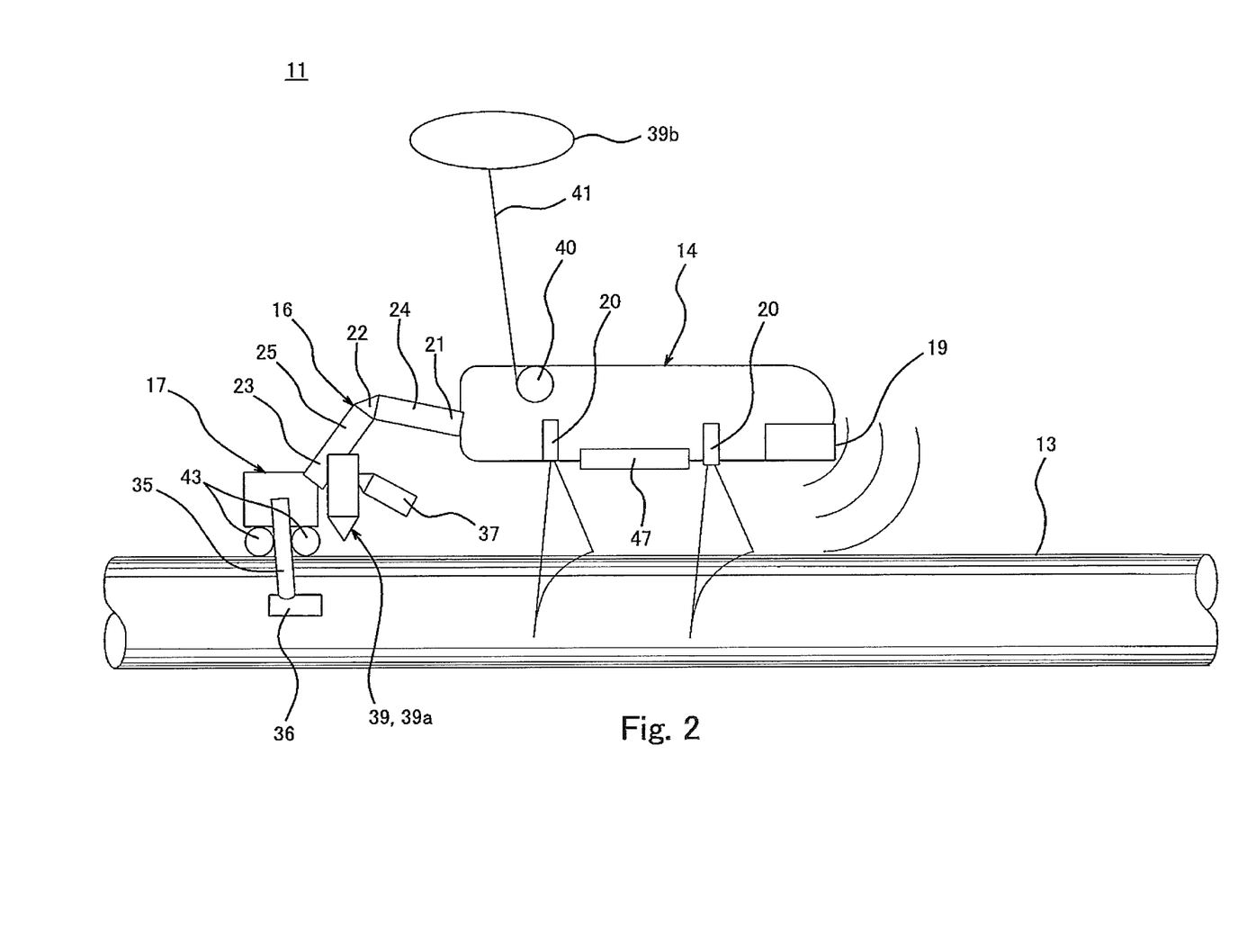
FIG. 2 is a side view showing a state where the underwater mobile inspection apparatus shown in FIG. 1 inspects an inspection object on the seafloor.

FIG. 1 shows a state where the anti-corrosion inspection device 39 is not in use. In FIG. 1, the electrode winch 40 is in a state of reeling in the linear object 41, and the remote electrode 39b is fixed to a vertical tail 42 of the cruising body 14. FIG. 2 shows a state where the anti-corrosion inspection device 39 is in use. In FIG. 2, the electrode winch 40 is in a state of reeling out the linear object 41, and the remote electrode 39b is placed at a position that is a predetermined distance away from the vertical tail 42 of the cruising body 14.

The wall thickness inspection device is a known conventional device, for example, a device configured to inspect the wall thickness of the subsea pipeline 13 for its overall length by using ultrasonic waves. Accordingly, the degree of corrosion of the subsea pipeline 13 and the presence or absence of damage to the subsea pipeline 13 can be inspected.

As shown in FIG. 1, the inspection tool unit 17 is provided with a running part 43 configured to allow the inspection tool unit 17 to run on the subsea pipeline 13 in such a manner as to contact the subsea pipeline 13. The running part 43 is realized by, for example, rolling portions such as wheels.

However, as an alternative, the running part 43 may include not only rolling portions such as wheels but also, for example, a sliding portion that allows the inspection tool unit 17 to slidingly move over the subsea pipeline 13.

Next, a description is given of a controller (not shown) included in the cruising body 14. The controller controls the cruising body 14 based on the inspection object information, such that the cruising body 14 autonomously cruises along the subsea pipeline 13 in such a manner as not to come into contact with the subsea pipeline 13.

As described above, the inspection object information is obtained by the first and second detectors 19 and 20. The inspection object information contains a positional relationship between the cruising body 14 and the subsea pipeline 13 as well as the shape of the pipeline.

The controller is configured to, when the cruising body 14 cruises based on the inspection object information along the subsea pipeline 13 in such a manner as not to come into contact with the subsea pipeline 13 as described above, operate the first movable arm 16 based on the same inspection object information to move the inspection tool unit 17, such that the positional relationship of the inspection tool unit 17 with the subsea pipeline 13 becomes a predetermined target positional relationship.

Moreover, the controller is configured to operate the pair of second movable arms 35 shown in FIG. 1 based on the inspection object information obtained by the first and second detectors 19 and 20, thereby moving the first and second image-capturing cameras 36 to their target positions. Specifically, the controller operates the second movable arms 35 to move the first and second image-capturing cameras 36 toward their target positions in accordance with, for example, the diameter of the subsea pipeline 13. That is, the controller can perform automatic correction of the positions of the first and second image-capturing cameras 36.

Furthermore, the controller is configured to operate the first movable arm 16 by force feedback control, such that the inspection tool unit 17, which runs on the subsea pipeline 13 shown in FIG. 1 in such a manner as to contact the subsea pipeline 13, is in pressure contact with the subsea pipeline 13 with predetermined force. In order to realize the force feedback control, the running part 43 (wheels) is provided with a load detector (not shown).

The load detector is configured to detect the pressure contact force of the inspection tool unit 17 against the subsea pipeline 13. The controller is configured to control the motion of the first movable arm 16, such that the detected force becomes target pressing force which is set in advance.

Next, functions of the underwater mobile inspection apparatus 11 with the above-described configuration are described. According to the underwater mobile inspection apparatus 11 shown in FIG. 1, in accordance with a preset program, the cruising body 14 can submerge under water and autonomously cruise along the subsea pipeline 13 in such a manner as not to come into contact with the subsea pipeline 13. At the time, the inspection tool unit 17 provided on the cruising body 14 via the first movable arm 16 can be controlled to follow the cruising body 14. Dashed lines 44 shown in FIG. 3A and FIG. 3B are cruising paths of the cruising body 14.

Specifically, the cruising body 14 can autonomously cruise along the subsea pipeline 13 in such a manner as not to come into contact with the subsea pipeline 13, because, for example, a map showing the installation location of the subsea pipeline 13 is stored in a memory of the controller, and the cruising of the cruising body 14 is controlled based on the pipeline installation location information indicated by the map and inspection object information.

When the cruising body 14 cruises along the subsea pipeline 13 in such a manner as not to come into contact with the subsea pipeline 13, the controller operates the first movable arm 16 to move the inspection tool unit 17, such that the positional relationship of the inspection tool unit 17 with the subsea pipeline 13 becomes a target positional relationship which is set in advance.

Figure 3A:
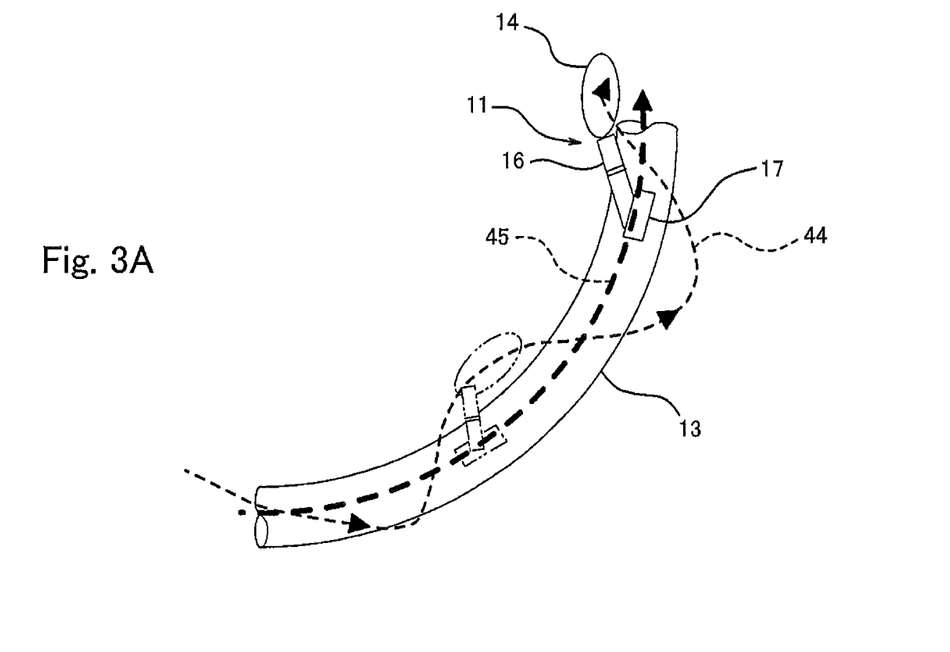
FIG. 3A is a plan view and FIG. 3B is a side view, showing moving paths of a cruising body and an inspection tool unit When the underwater mobile inspection apparatus shown in FIG. 1 inspects an inspection object on the seafloor.
Figure 3B:
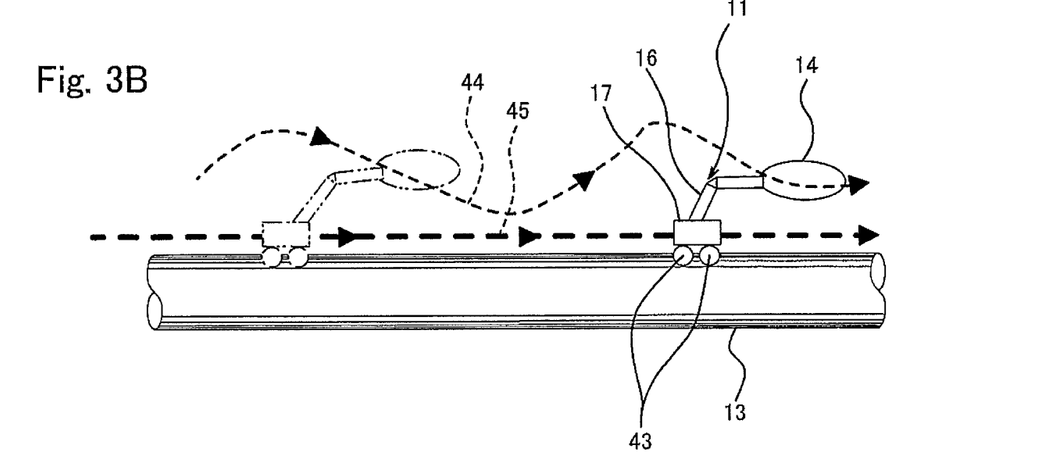
Figure 4:
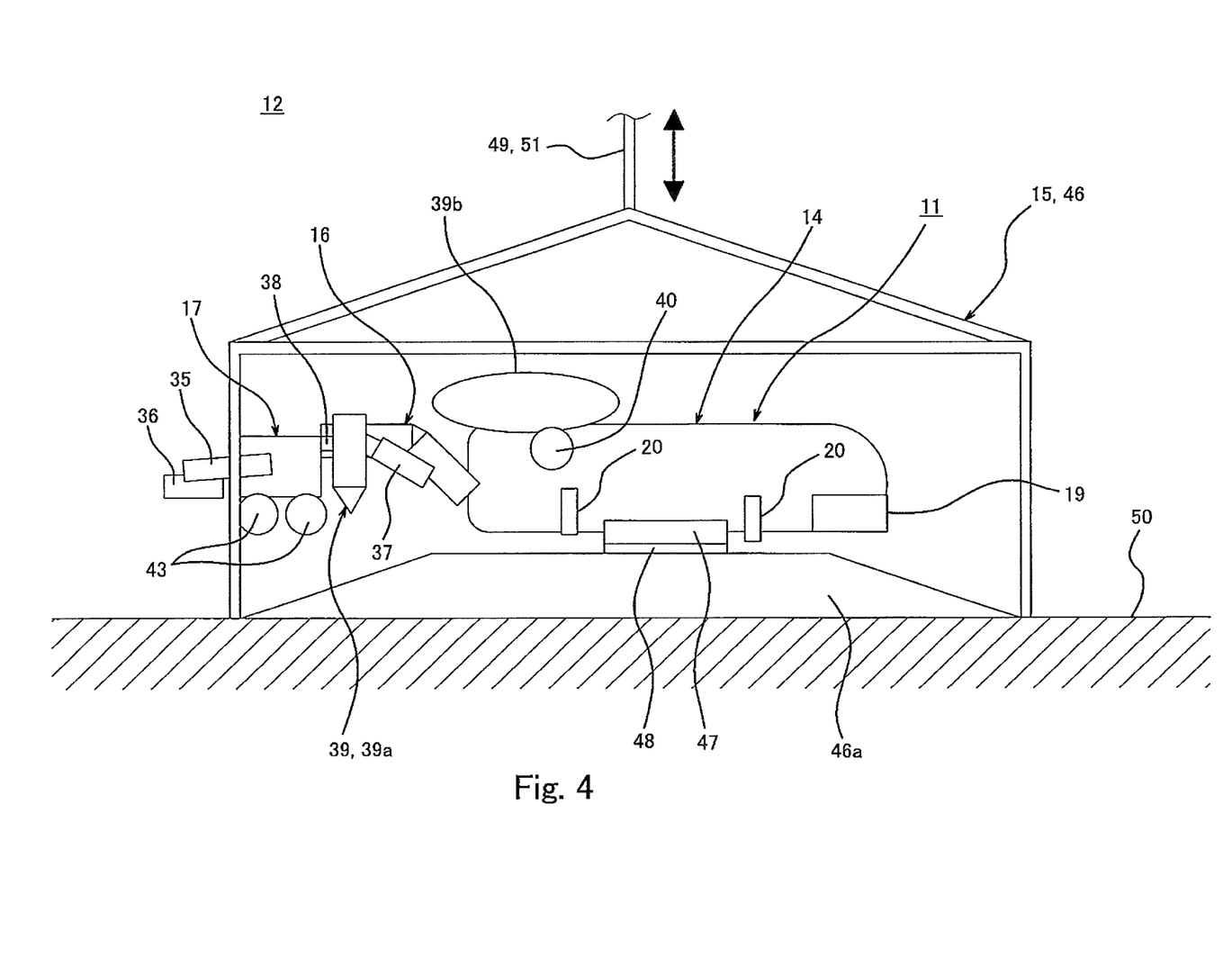
FIG. 4 is a side view of underwater inspection equipment according to the embodiment of the present invention, showing a state where the underwater mobile inspection apparatus is docked with a docking station.

The target positional relationship of the inspection tool unit 17 with the subsea pipeline 13 is, as indicated by dashed lines 45 in FIG. 3A and FIG. 3B, a positional relationship in which the inspection tool unit 17 is positioned substantially right above the central axis of the subsea pipeline 13 and runs on the subsea pipeline 13 in a state of being in contact with the upper surface of the subsea pipeline 13.

As described above, the cruising body 14 is configured to submerge under water and cruise along the subsea pipeline 13 in such a manner as not to come into contact with the subsea pipeline 13. This makes it possible to prevent the weight of the cruising body 14 and inertial force exerted on the cruising body 14 from being applied to the subsea pipeline 13. Consequently, damage to the subsea pipeline 13 due to receiving the weight of the cruising body 14 and the inertial force exerted on the cruising body 14 can be prevented. This makes it possible to perform high-speed inspection work while cruising at a high speed.

Moreover, even if heavy-weight mechanical tools and devices necessary for the inspection work are loaded on the cruising body 14, force based on the mass of the cruising body 14 is not applied to the subsea pipeline 13. Therefore, more mechanical tools and the like can be loaded on the cruising body 14 compared to the conventional art This makes it possible to improve the quality of various work, including an inspection and cleaning of the subsea pipeline 13.

Furthermore, the controller is configured to, when the cruising body 14 cruises along the subsea pipeline 13, operate the first movable arm 16 to move the inspection tool unit 17, such that the positional relationship of the inspection tool unit 17 With the subsea pipeline 13 becomes a predetermined target positional relationship. Therefore, by means of the inspection tool unit 17, an inspection of a predetermined target area of the subsea pipeline 13 (in the present embodiment, the left side surface, the right side surface, and the upper surface of the subsea pipeline 13 are the predetermined target area) can be precisely performed. Thus, provided is the underwater mobile inspection apparatus 11, which makes it possible to improve the quality of various work, including an inspection and cleaning of the subsea pipeline 13.

In the present embodiment, the left side surface, the right side surface, and the upper surface of the subsea pipeline 13 are to be inspected. However, the inspection may be additionally performed on, for example, the lower surface of the subsea pipeline 13.

As described above, the cruising body 14 includes the controller. The controller can control the cruising body 14 based on the inspection object information obtained by the first and second detectors 19 and 20 so that the cruising body 14 will autonomously cruise along the subsea pipeline 13 in such a manner as not to come into contact with the subsea pipeline 13, which is, for example, bent as shown in FIGS. 3A and 3B.

The inspection object information is information containing, for example, a positional relationship between the cruising body 14 and the subsea pipeline 13 as well as the shape of the pipeline 13. The inspection object information is, for example, information about the degree of bending of the pipeline 13 and information about the presence or absence of foreign matter on the pipeline 13.

Since the cruising body 14 is configured to autonomously cruise along the subsea pipeline 13, it is not necessary to remote-control the underwater mobile inspection apparatus 11 from an offshore support ship, and the subsea pipeline 13 can be inspected automatically. This makes it possible to reduce labor hours, labor costs, and costs of the support ship for inspecting the subsea pipeline 13.

Further, when the cruising body 14 autonomously cruises along the subsea pipeline 13 in such a manner as not to come into contact with the subsea pipeline 13, the controller can operate the second movable arms 35 shown in FIG. 1 based on the inspection object information to move the first and second image-capturing cameras 36, such that the positional relationship of the first and second image-capturing cameras 36 with the subsea pipeline 13 becomes a predetermined target positional relationship.

The above configuration allows the first to third image-capturing cameras 36 and 37 to precisely capture images of the external view of the predetermined target area of the subsea pipeline 13. By visually confirming image data of the captured images, an operator is allowed to perform precise visual inspection of the subsea pipeline 13.

The target positional relationship of the first and second image-capturing cameras 36 with the subsea pipeline 13 is, as shown in FIG. 1, a positional relationship in which the first and second image-capturing cameras 36 are in such positions as to be able to capture images of the left and right side surfaces of the subsea pipeline 13.

The target positional relationship of the third image-capturing camera 37 with the subsea pipeline 13 is, as shown in FIG. 1, a positional relationship in which the third image-capturing camera 37 is in such a position as to be able to capture an image of the upper surface of the subsea pipeline 13.

As shown in FIG. 1, the inspection tool unit 17 includes the anti-corrosion inspection device 39 and the wall thickness inspection device (not shown). Therefore, when the underwater mobile inspection apparatus 11 submerges under water and cruises along the subsea pipeline 13 in such a manner as not to come into contact with the subsea pipeline 13, for example, the degree of degradation of the anti-corrosion treatment (e.g., anti-corrosion coating) of the subsea pipeline 13 can be automatically inspected by using the anti-corrosion inspection device 39. In addition, the wall thickness of the subsea pipeline 13 can be automatically inspected by using the wall thickness inspection device. Thus, the degree of corrosion of the subsea pipeline 13 and the presence or absence of damage to the subsea pipeline 13 can be inspected.

When an anti-corrosion potential measurement device is used as the anti-corrosion inspection device 39 as shown in FIG. 2, first, the linear object 41 is reeled out from the electrode winch 40 of the cruising body 14 by a predetermined length, and the remote electrode 39*b* connected to the linear object 41 is moved away from the potential measurement probe 39*a* of the inspection tool unit 17 by a predetermined distance. Next, a potential difference between the potential measurement probe 39*a* positioned near the subsea pipeline 13 and the remote electrode 39*b* is measured. Based on the measured potential difference, the degree of the anti-corrosion protection (i.e., the degree of corrosion) of the subsea pipeline 13 can be inspected.

The electrode winch 40 for reeling in or out the linear object 41 to which the remote electrode 39*b* of the anti-corrosion inspection device 39 is connected is provided on the cruising body 14. Since the cruising body 14 can cruise along the subsea pipeline 13 in such a manner as not to come into contact with the subsea pipeline 13, damage to the subsea pipeline 13 due to force based on the mass of the cruising body 14 including the electrode winch 40 can be prevented.

Further, as shown in FIG. 1, the first movable arm 16 includes the first and second parallel link mechanisms 24 and 25. This makes it possible to reduce a necessary number of joints of the first movable arm 16 for the controller to operate the first movable arm 16 to move the inspection tool unit 17 such that the positional relationship of the inspection tool unit 17 with the subsea pipeline 13 becomes a predetermined target positional relationship. As a result, a compact and light-weight first movable arm 16 can be provided, and also, the control of the first movable arm 16 can be readily performed.

As shown in FIG. 1, the inspection tool unit 17 is provided with the running part 43 (wheels), which allows the inspection tool unit 17 to run on the subsea pipeline 13. Accordingly, the inspection tool unit 17 can run on the subsea pipeline 13 while following the cruising of the cruising body 14. Since the inspection tool unit 17 runs on the subsea pipeline 13, the subsea pipeline 13 serves to assist in guiding the inspection tool unit 17 to be in a predetermined target positional relationship with the subsea pipeline 13.

The controller is configured to operate the first movable arm 16 by force feedback control, such that the inspection tool unit 17 is in pressure contact with the subsea pipeline 13 with predetermined force. Therefore, even though there is the weight of the inspection tool unit 17 as well as inertial force exerted on the inspection tool unit 17, force applied to the subsea pipeline 13 can be controlled to be predetermined target pressing force. This consequently makes it possible to prevent a situation where the subsea pipeline 13 receives force based on the mass of the cruising body 14 and thereby becomes damaged.

Further, by using wheels as the running part 43 of the inspection tool unit 17, the body of the inspection tool unit 17 can be assuredly prevented from coming into contact with the subsea pipeline 13, and thereby damage to the inspection tool unit 17 due to such contact can be prevented.

Next, the underwater inspection equipment 12 is described with reference to FIG. 4. The underwater inspection equipment 12 shown in FIG. 4 includes the underwater mobile inspection apparatus 11 and the docking station 15 disposed on the seafloor.

The docking station 15 includes a substantially parallelepiped cage-like unit 46. The underwater mobile inspection apparatus 11 enters the inside of the cage-like unit 46 where the underwater mobile inspection apparatus 11 can be docked. A second connector 48 is provided on a floor 46*a* of the cage-like unit 46.

As shown in FIG. 4, the underwater mobile inspection apparatus 11 can be docked with and unlocked from the docking station 15 disposed on the seafloor. In a state where the underwater mobile inspection apparatus 11 is docked with the docking station 15, a first connector 47 provided on the underwater mobile inspection apparatus 11 is connected to the second connector 48 provided in the docking station 15 so that charging of a battery included in the cruising body 14 of the underwater mobile inspection apparatus 11, transmission of inspection data that has been obtained, and reception of an inspection instruction can be performed.

For example, the docking station 15 is suspended by a rope 49 from an offshore production base. The rope 49 is reeled in or out by a hoist (not shown). Accordingly, the docking station 15 is lifted and lowered by the hoist, and thereby the docking station 15 can be drawn up onto the offshore production base or set on a seafloor 50.

The offshore production base and the docking station 15 are connected to each other by a cable 51. Via the cable 51, electric power for use in charging the battery can be supplied, and an inspection instruction can be transmitted, from the offshore production base to the docking station 15. Moreover, inspection data obtained by the underwater mobile inspection apparatus 11 can be transmitted from the docking station 15 to the offshore production base via the cable 51. The second connector 48 of the docking station 15 is connected to the cable 51. The offshore production base is, for example, a petroleum gas production rig or a floating crude oil production, storage and offloading facility.

According to the underwater inspection equipment 12 shown in FIG. 4, after the underwater mobile inspection apparatus 11 has inspected the subsea pipeline 13, the underwater mobile inspection apparatus 11 is docked with the docking station 15 disposed on the seafloor 50, and the first connector 47 of the underwater mobile inspection apparatus 11 is connected to the second connector 48 of the docking station 15. In this state, charging of the battery of the underwater mobile inspection apparatus 11, transmission of inspection data that has been obtained, and reception of an inspection instruction can be performed.

In other words, the underwater mobile inspection apparatus 11 can transmit the obtained inspection data to the offshore production base via the docking station 15, and an operator can know inspection results of the subsea pipeline 13 based on the transmitted inspection data. Then, based on a received inspection instruction, the underwater mobile inspection apparatus 11 can perform an inspection of, for example, a next subsea pipeline 13. When the battery of the underwater mobile inspection apparatus 11 has been charged, the underwater mobile inspection apparatus 11 can go on to the inspection of, for example, the next subsea pipeline 13 while keeping staying in a submerged state at the seafloor. This makes it possible to reduce a time required for performing the inspections and reduce labor hours.

The underwater mobile inspection apparatus 11 included in the underwater inspection equipment 12 shown in FIG. 4 is configured to store inspection data in a recording device (not shown) included in the cruising body 14 of the underwater mobile inspection apparatus 11, the inspection data containing image data that is obtained by capturing images of the subsea pipeline 13 with the first to third image-capturing cameras 36 and 37. In a state where the underwater mobile inspection apparatus 11 is docked with the docking station 15, or after the underwater mobile inspection apparatus 11 is docked with the docking station 15, the inspection data containing the image data can be transmitted to the offshore production base via the cable 51 of the docking station 15.

According to the underwater inspection equipment 12, when the underwater mobile inspection apparatus 11 inspects the subsea pipeline 13, the first to third image-capturing cameras 36 and 37 capture images of the subsea pipeline 13, and inspection data containing image data of the captured images can be stored in the recording device included in the underwater mobile inspection apparatus 11. Then, in a state where the underwater mobile inspection apparatus 11 is docked with the docking station, or after the underwater mobile inspection apparatus 11 is docked with the docking station, the inspection data stored in the recording device, which contains the image data, can be transmitted to, for example, an offshore location via the cable 51.

Although the above embodiment has been described by taking a subsea pipeline as an example of the inspection object 13, the inspection object 13 is not limited to a subsea pipeline, but may be, for example, a submarine electrical cable laid on the seafloor or a subsea structure such as a jacket.

In the above-described embodiment, the underwater mobile inspection apparatus 11 cruises along the subsea pipeline 13, and while cruising, inspects the subsea pipeline 13 by means of the inspection tool unit 17. However, as an alternative, the underwater mobile inspection apparatus 11 may inspect a facility or a building built on the seafloor.

Further, in the above-described embodiment, as shown in FIG. 1, the inspection tool unit 17 is provided with the wheels 43. The inspection tool unit 17 inspects the subsea pipeline 13 while running on the subsea pipeline 13 in such a manner as to contact the subsea pipeline 13 via the wheels 43. However, the inspection tool unit 17 need not be provided with the wheels 43, and the inspection tool unit 17 may inspect the subsea pipeline 13 while moving along the subsea pipeline 13 in such a manner as not to come into contact with the subsea pipeline 13.

Also in this case, the controller is configured to control the first movable arm 16 such that the positional relationship of the inspection tool unit 17 with the subsea pipeline 13 becomes a predetermined target positional relationship.

If the inspection tool unit 17 performs the inspection of the subsea pipeline 13 in such a non-contact manner as above, a situation where the subsea pipeline 13 receives the weight of the inspection tool unit 17 and inertial force exerted on the inspection tool unit 17 and thereby becomes damaged can be prevented. This makes it possible to perform faster inspection work by faster cruising.

Further, in the above-described embodiment, the cruising body 14 is not remote-controlled but cruises autonomously. However, as an alternative, a cable may be connected to the cruising body, and an operator may remote-control the cruising body via the cable from an offshore location or from the ground to inspect the subsea pipeline 13.

INDUSTRIAL APPLICABILITY

As described above, the underwater mobile inspection apparatus and underwater inspection equipment according to the present invention make it possible to prevent damage to an inspection object such as a subsea structure, the damage being due to receiving force based on the mass of the cruising body, and provide an excellent advantage of improving the quality of various work, including an inspection of the inspection object. Thus, the present invention is suitably applicable to underwater mobile inspection apparatuses and underwater inspection equipment.

REFERENCE SIGNS LIST 11 underwater mobile inspection apparatus
12 underwater inspection equipment
13 inspection object (subsea pipeline)
14 cruising body
15 docking station
16 first movable arm
17 inspection tool unit
18 thruster
19 fist detector 20 second detector
21 first joint
22 second joint
23 third joint
24 first parallel link mechanism
24a parallel link
25 second parallel link mechanism
25a parallel link
26 first frame
27 second frame
28 third frame
29 vertical shaft
30 support protrusion
31, 32, 33, 34 horizontal shaft
35 second movable arm
36 first and second image-capturing cameras
37 third image-capturing camera
38 bracket
39 anti-corrosion inspection device
39a potential measurement probe
39b remote electrode
40 electrode winch
41 linear object
42 vertical tail
43 running part (wheels)
44 dashed line indicating a cruising path
45 dashed line indicating a running path
46 cage-like unit
46a floor
47 first connector
48 second connector
49 rope
50 seafloor
51 cable
52 vertical shaft

What is claimed is:

1. An underwater mobile inspection apparatus capable of inspecting an inspection object on a seafloor while cruising, the underwater mobile inspection apparatus comprising:
a cruising body configured to submerge under water and cruise along the inspection object in such a manner as not to come into contact with the inspection object;
a first movable arm provided on the cruising body;
an inspection tool unit for use in inspecting the inspection object, the inspection tool unit being provided on the first movable arm; and
a controller configured to, when the cruising body cruises along the inspection object in such a manner as not to come into contact with the inspection object, operate the first movable arm to move the inspection tool unit, such that a positional relationship of the inspection tool unit with the inspection object becomes a predetermined target positional relationship, wherein
the controller:
stores a map showing an installation location of the inspection object; and
controls the cruising body based on installation location information indicated by the map, the installation location information specifying the installation location of the inspection object, such that the cruising body autonomously cruises along the inspection object in such a manner as not to come into contact with the inspection object.

2. The underwater mobile inspection apparatus according to claim 1, wherein
the cruising body includes an inspection object detector configured to obtain inspection object information containing a positional relationship between the cruising body and the inspection object and a shape of the inspection object, and
the controller controls the cruising body based on the installation location information and the inspection object information, such that the cruising body autonomously cruises along the inspection object in such a manner as not to come into contact with the inspection object.

3. The underwater mobile inspection apparatus according to claim 1, comprising:
an inspection object detector included in the cruising body and configured to obtain inspection object information containing a positional relationship between the inspection tool unit and the inspection object and a shape of the inspection object;
a second movable arm provided on the inspection tool unit; and
an image-capturing camera for use in visually inspecting the inspection object, the image-capturing camera being provided on the second movable arm, wherein
the controller controls the second movable arm based on the inspection object information, such that a positional relationship of the image-capturing camera with the inspection object becomes a predetermined target positional relationship.

4. The underwater mobile inspection apparatus according to claim 1, herein the inspection tool unit includes at least one of an anti-corrosion inspection device and a wall thickness inspection device.

5. The underwater mobile inspection apparatus according to claim 4, wherein
the anti-corrosion inspection device includes an anti-corrosion potential measurement device, and
the anti-corrosion potential measurement device includes:
a potential measurement probe provided on the inspection tool unit; and
a remote electrode connected to a linear object reeled out from an electrode winch provided on the cruising body.

6. The underwater mobile inspection apparatus according to claim 1, wherein the first movable arm includes a parallel link mechanism.

7. The underwater mobile inspection apparatus according to claim 1, wherein
the inspection tool unit is provided with a running part configured to allow the inspection tool unit to run on the inspection object, and
the controller operates the first movable arm by force feedback control, such that the inspection tool unit is in pressure contact with the inspection object with predetermined target pressing force.

8. The underwater mobile inspection apparatus according to claim 7, wherein the running part is a wheel.

9. Underwater inspection equipment comprising:
the underwater bile inspection apparatus according to claim 1; and
a docking station disposed on a seafloor, wherein
the underwater mobile inspection apparatus is configured to be docked with and undocked from the docking station disposed on the seafloor, and
in a state where the underwater mobile inspection apparatus is docked with the docking station, a first connector provided on the underwater mobile inspection apparatus is connected to a second connector provided in the docking station, and charging of a battery of the underwater mobile inspection apparatus, transmission of inspection data that has been obtained, or reception of an inspection instruction is performed.

10. The underwater inspection equipment according to claim 9, comprising an underwater mobile inspection apparatus including:
an inspection object detector included in the cruising body and configured to obtain inspection object information containing a positional relationship between the inspection tool unit and the inspection object and a shape of the inspection object
a second movable arm provided on the inspection tool unit and
an image-capturing camera for use in visually inspecting the inspection object, the image-capturing camera being provided on the second movable arm, wherein
the controller controls the second movable arm based on the inspection object information, such that a positional relationship of the image-capturing camera with the inspection object becomes a predetermined target positional relationship; wherein
the underwater mobile inspection apparatus is configured to store image data in a recording device included in the underwater mobile inspection apparatus, the image data being obtained by capturing an image of the inspection object with the image-capturing camera, and
in a state where the underwater mobile inspection apparatus is docked with the docking station, the underwater mobile inspection apparatus transmits the image data.

11. The underwater mobile inspection apparatus according to claim 2, comprising:
an inspection object detector included in the cruising body and configured to obtain inspection object information containing a positional relationship between the inspection tool unit and the inspection object and a shape of the inspection object;
a second movable arm provided on the inspection tool unit; and
an image-capturing camera for use in visually inspecting the inspection object, the image-capturing camera being provided on the second movable arm, wherein
the controller controls the second movable arm based on the inspection object information, such that a positional relationship of the image-capturing camera with the inspection object becomes a predetermined target positional relationship.

* * * * *